INVENTOR:
James Dobson Altemus,
BY
His ATTORNEY.

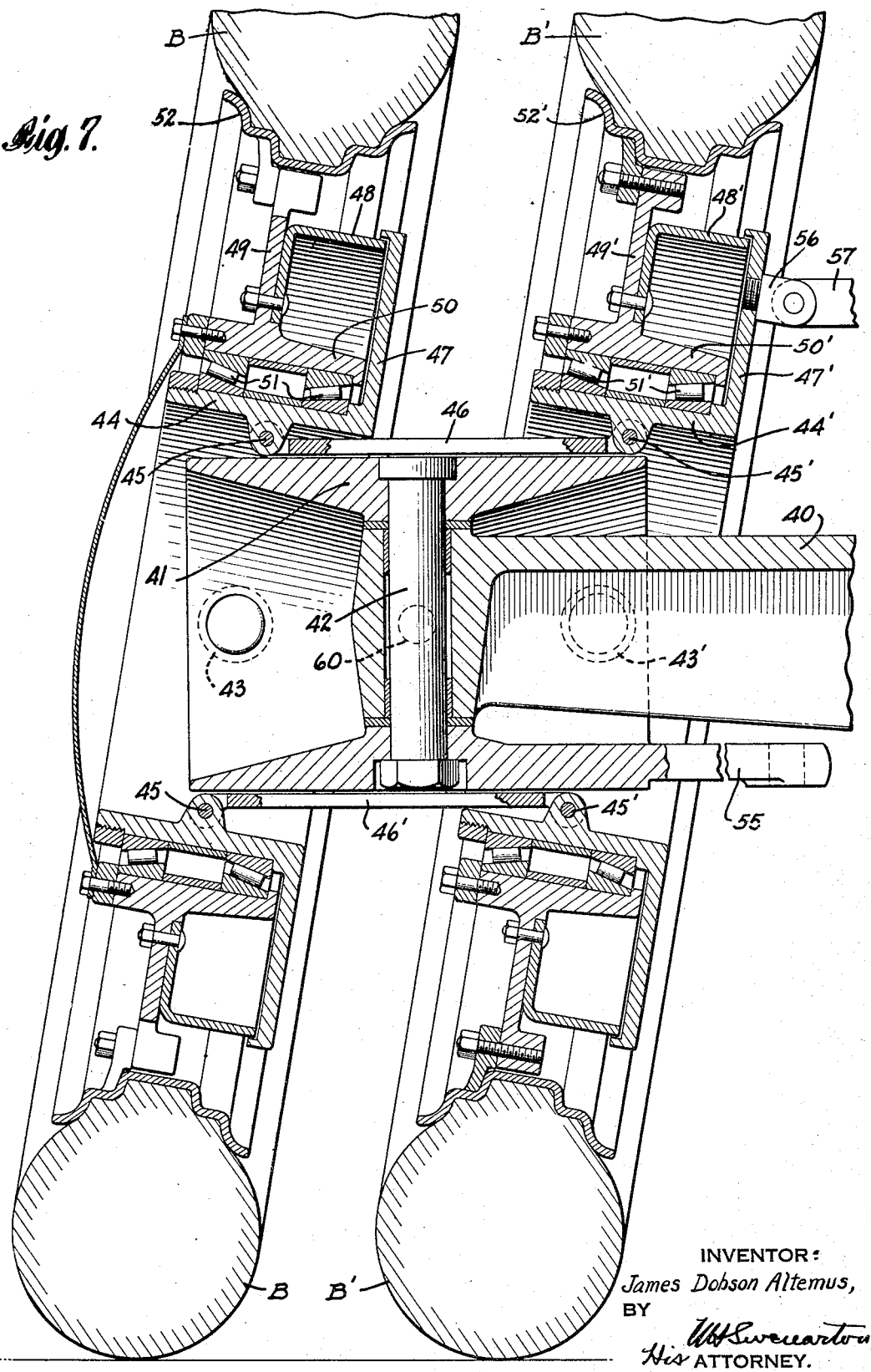

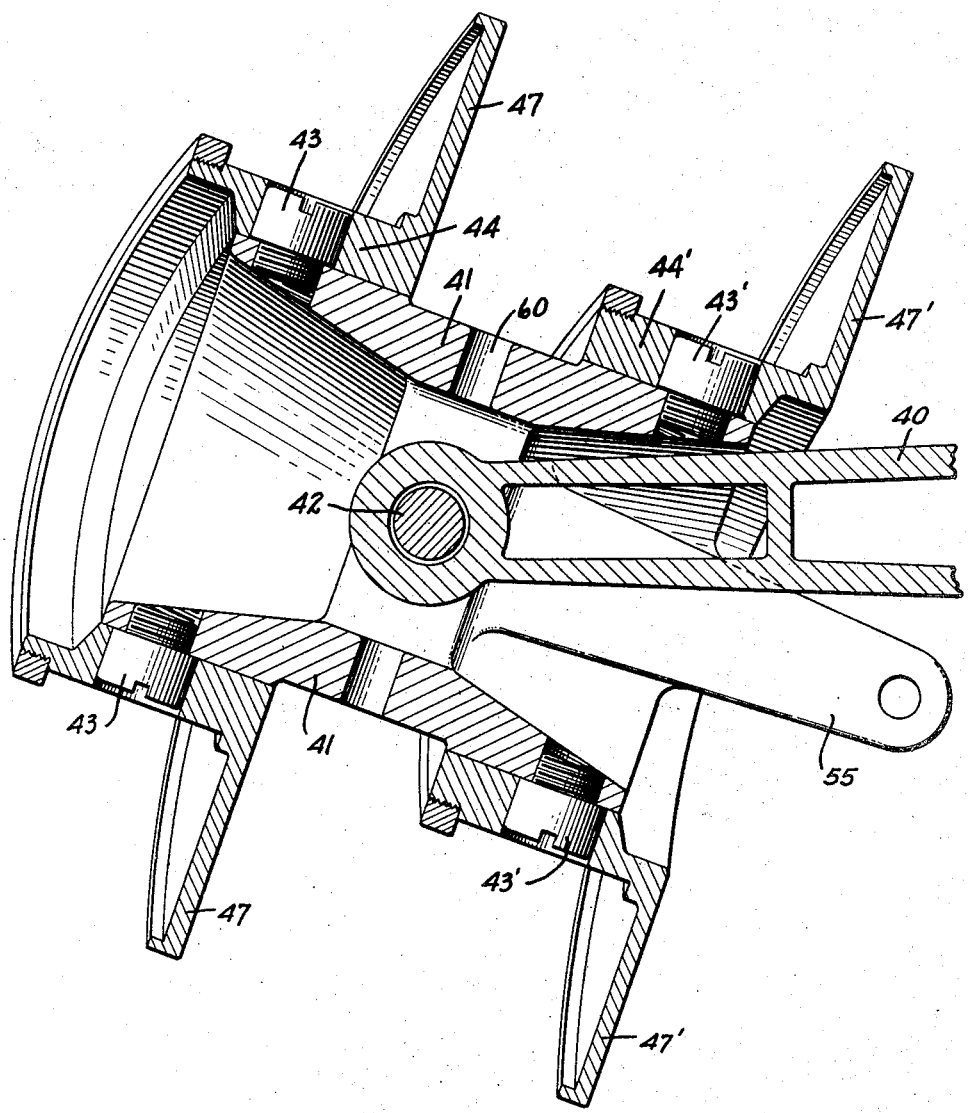

Patented May 27, 1941

2,243,181

UNITED STATES PATENT OFFICE 2,243,181

TILTABLE AND INDEPENDENTLY ROTATABLE DUAL WHEELS FOR TRUCKS, ETC.

James Dobson Altemus, Roslyn, N. Y.

Application October 4, 1939, Serial No. 297,853

8 Claims. (Cl. 180—22)

This invention relates to a dual wheel assemblage for trucks, omnibuses and the like and has for its particular objects the provision of a simple, sturdy and economical mechanism for effecting the banking of such dual wheels in order to minimize the tendency of the vehicle wheels to skid under the influence of centrifugal force when rounding a sharp turn on the pavement or when travelling on wet pavements under conditions when skidding might otherwise occur. Other objects of the invention will hereinafter appear.

A preferred embodiment of my invention, as applied to the driving and trailer wheels of a truck, is fully set forth in the following detailed description and drawings forming a part thereof, in which latter—

Fig. 7 is a fragmentary, vertical section of a dual front or trailer wheel assemblage embodying my invention; and Fig. 8 is an enlarged horizontal section of a fragment of the wheel shown in Fig. 7, isolated.

Figure 1:
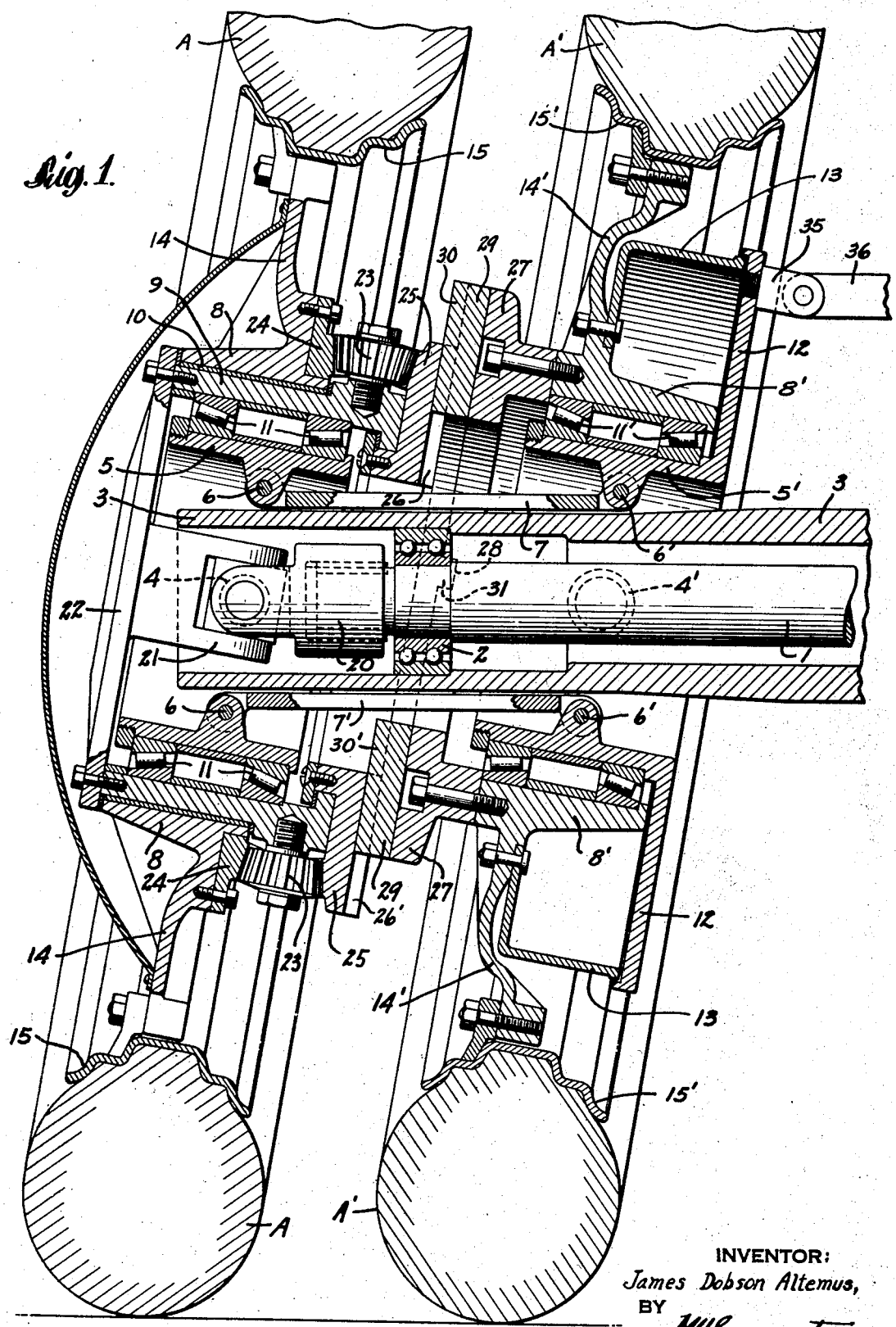
Figure 1 is a fragmentary, vertical section of a driving dual wheel assembly embodying my invention, the wheels being shown in a banked position.

Referring to the drawings and the dual wheel assemblage shown therein, the reference numeral 1 designates one of the half axles of a conventional differential drive and 2 the ball bearing support therefor, the same being mounted within the axle housing 3. Horizontally projecting tilting trunnions 4, 4', mounted in bosses formed on the axle housing 3, serve to support main journals 5, 5' which are articulated together by means of pivots 6, 6' and links 7, 7' whereby parallel motion of said wheels is at all times insured. Said journals 5, 5' are supported within the wheel hubs 8, 8' and a pinion-carrying ring 9 is rotatably mounted between the hub 8 and journal 5 of the outer wheel. A bushing 10 and bearings 11, 11' which are mounted externally of the journals 5, 5' function to minimize friction during operation of the vehicle. A backing plate 12 for the brake drum 13 is integrally formed on the journal 5', the same supporting the hydraulic or mechanical braking mechanism of conventional form (not shown) in the well known manner. The reference numerals 14, 14' designate the outer and inner wheels of the dual assemblage whose rims 15, 15' carry pneumatic tires A, A' which are mounted thereon in the well known manner.

Figure 2:
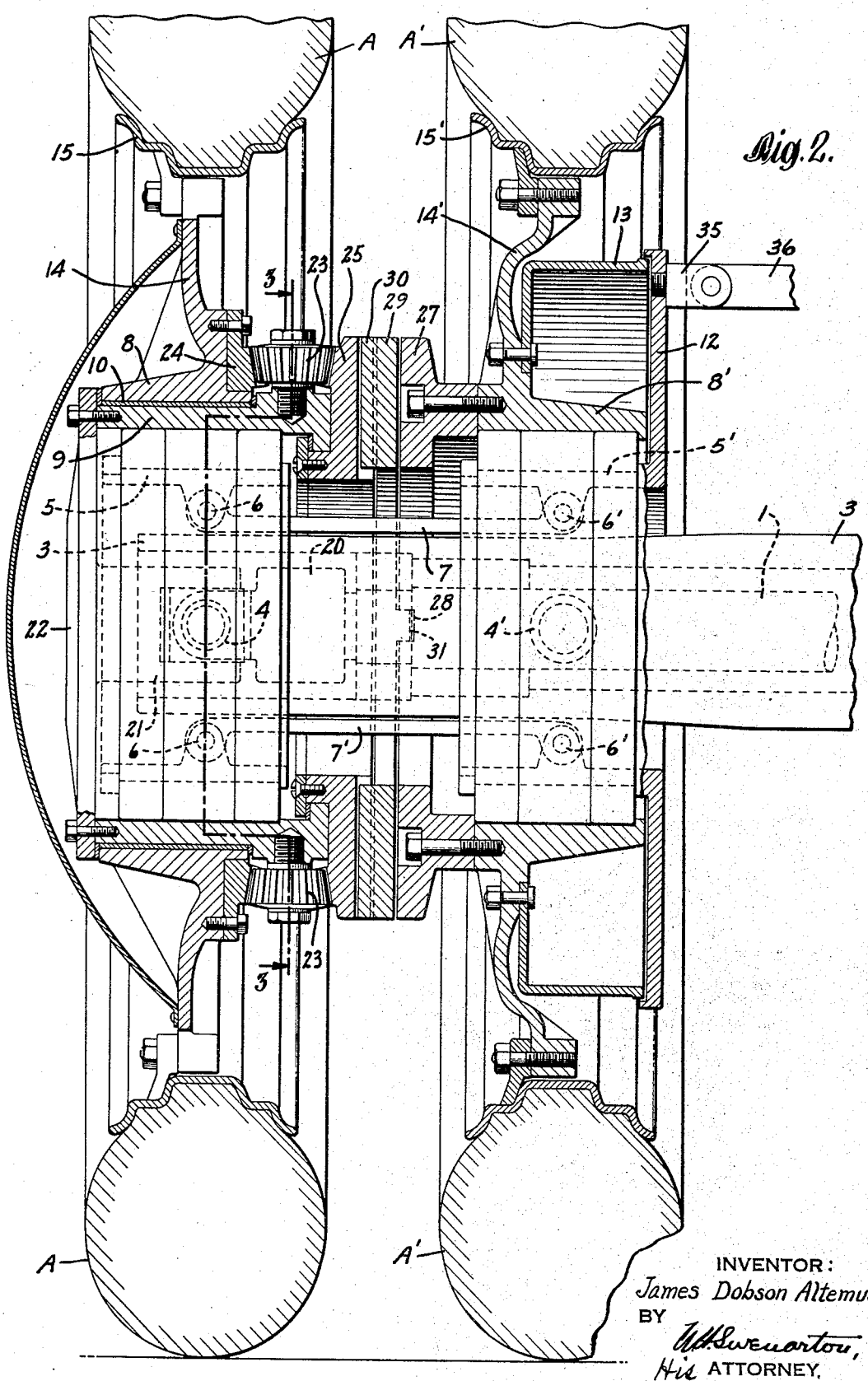
Fig. 2 is a horizontal section of the dual wheel assembly shown in Fig. 1, but the wheels being shown in a normal or unbanked position.
Figure 3:
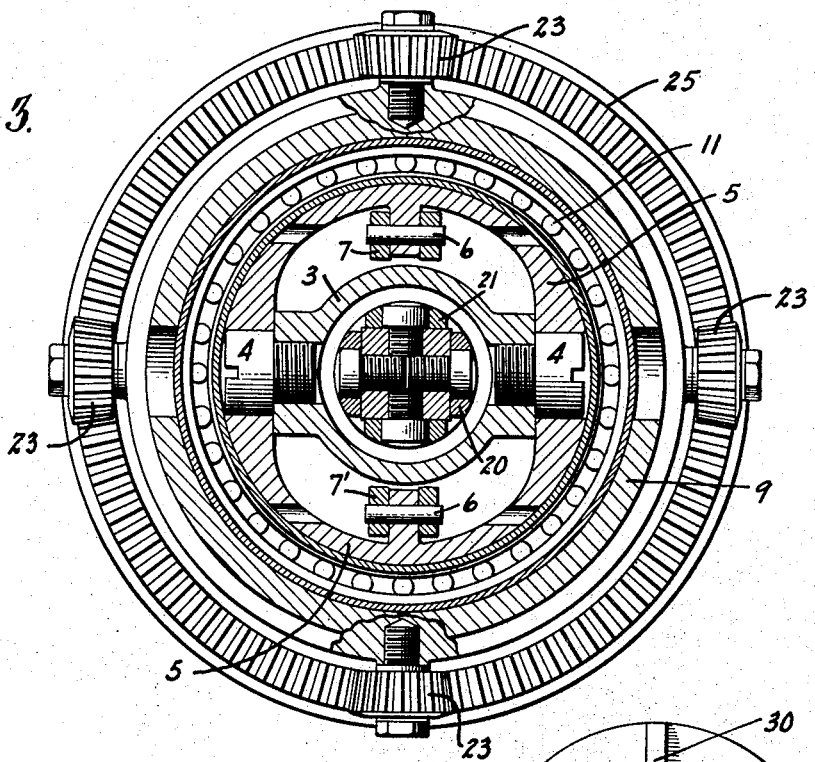
Fig. 3 is a vertical section on the line 3—3 of Fig. 2.
Figure 4:
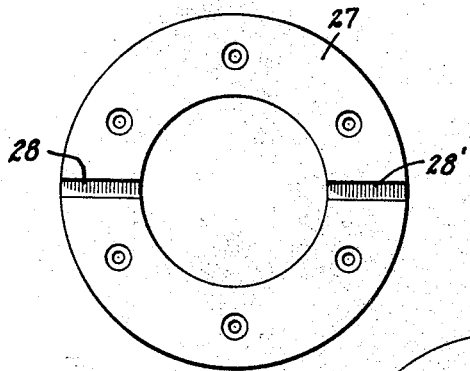
Figs. 4, 5 and 6 are plan views respectively of the three members of a so-called Oldham coupling, isolated.
Figure 5:
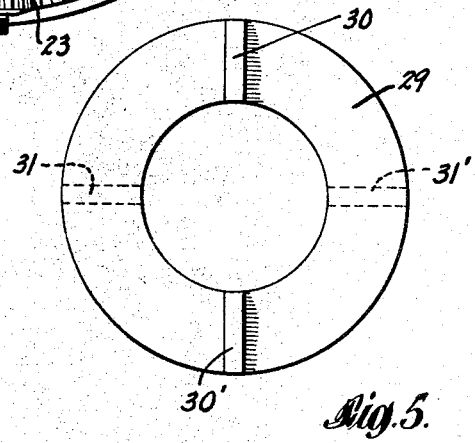
Figure 6:
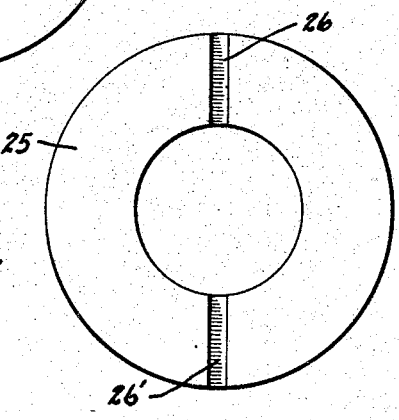

Members 20 and 21 of a universal joint of standard construction serve to flexibly connect the driving axle 1 to a drive plate 22 which is bolted to the ring 9. Pinions 23 are circumferentially mounted on the said ring 9, the same meshing respectively with a ring gear 24 bolted to the outer wheel 14 and also a ring gear 25 which constitutes one element of the well known Oldham coupling such as is commonly employed for connecting two shafts that are but slightly out of alinement. Said element 25 has opposed axially extending key ways 26, 26' formed on its inner face and the element 25 of said coupling which is bolted to the inner wheel 14', has opposing key ways 28, 28' formed on the front face thereof which extend axially thereof but at right angles to the key ways 26, 26' on the element 25. The center member 29 of the coupling has axially extending keys 30, 30' and 31, 31' formed on the opposite faces thereof, the keys 30, 30' extending at right angles to the keys 31, 31' and, as shown in Fig. 2, said keys 30, 30' respectively cooperate with the aforesaid key ways 26, 26' while the keys 31, 31' cooperate respectively with said key ways 28, 28'.

A pivot block 35, carried by the backing plate 12 and link 36, serves to connect the dual wheel assemblage to the tilting mechanism (not shown) which latter may be of any suitable type but is desirably of the type disclosed in my co-pending application No. 258,544 filed Feb. 25, 1939.

Referring to the construction of the front or trailer wheel assemblage shown in Fig. 7, the reference numeral 40 designates an axle of the channel beam type to which a trunnion block 41 is pivotally connected by the king pin 42 so as to permit of the tilting of the dual wheel assemblage in a vertical plane while admitting of the turning of the wheels for steering purposes through a horizontal plane. Horizontal trunnions 43, 43', which are generally similar to the trunnions 4, 4', are mounted in the trunnion block 41 and serve to carry the main journals 44, 44' which latter are connected together by means of pivots 45, 45' and links 46, 46' and thereby the parallelism of the dual wheels of the assemblage at all times during the tilting and steering operations is insured. Backing plates 47, 47' which are integral with the journals 44,

44', respectively, serve to support braking mechanism of the conventional type (not shown). Brake drums 48, 48' are respectively carried by the outer and inner wheels 49, 49' whose hubs 50, 50' are supported by roller bearings 51, 51' carried by the journals 44, 44'. An arm 55, formed integral with trunnion block 41, serves to connect said dual wheel assemblage to conventional steering mechanism (not shown).

As is apparent from the foregoing description, the employment of the Oldham type coupling in association with a pinion carried by the rotatable cylindrical sleeve 9, which pinion meshes with the ring gear 24 and the ring gear carried by the outer plate or disc element 25 of said coupling, insures of rotation of the inner wheel upon the rotation of the outer wheel by the drive shaft while admitting of the tilting of said wheels in unison and of the differential rotation thereof when rounding a turn in the road.

The anti-skidding effect which is realized on vehicles equipped with my improved dual wheel banking assemblage and appropriate tilting mechanism therefor is due to the fact that instead of the pneumatic tires with which such wheels are usually now equipped tending to buckle or fold under the wheel rim of a wheel that is rotating in a vertical plane, such as is ordinarily the case in the present automobile, and which tendency actually contributes to the skidding of the wheel of the vehicle, the tires in an automobile equipped with my improved dual wheel banking assemblage, are actually rolled transversely through a small arc and exert a wedging action against the pavement, thereby effectively resisting the tendency of the wheels to skid on the pavement.

My improved dual wheel banking assemblage materially prolongs the life of the tires, especially pneumatic tires, since the frictional wear, due to skidding, which invariably occurs to a minor extent in the case of slight turns in the road and to a major extent in the case of sharp bends which are traversed at high speed, is very materially reduced and the wear is chiefly confined to the ordinary frictional wear due to rotation of the wheels as they travel over the pavement, such wear as for example occurs in the ordinary automobile when the same is travelling in a straight path on a highway.

The reduction or even in many cases the substantial elimination of the skidding tendency of a vehicle equipped with my improved dual wheel banking assemblage and power tilting means for operating the same is to a substantial extent due to the deflection of the horizontal centrifugal forces exerted on the vehicle when rounding a sharp turn at high speeds into an oblique downwardly directed force which supplements gravity and augments the aforesaid wedging action of the tires against the pavement.

Various changes from the construction herein described may be made without departing from the spirit of my invention as embraced within the scope of the appended claims.

Having thus described my invention, what I claim and desire to obtain by United States Letters Patent is:

1. A dual wheel assemblage, comprising a tubular axle housing, two pairs of opposing trunnions carried thereby, two hollow journals tiltable in a vertical plane which are interconnected so as to tilt in parallelism with each other and each of which is supported on a different pair of trunnions, a wheel mounted on each journal, coupling means between said wheels, a universal joint for connecting one of said wheels to a drive axle and means for connecting one of said journals to wheel tilting mechanism.

2. A dual wheel assemblage, comprising a tubular axle housing, two pairs of opposing trunnions carried thereby, two cylindrical journals tiltable in a vertical plane which are interconnected so as to tilt in unison and each of which is supported on a different pair of trunnions, a wheel, having a central hub member, mounted on each journal, coupling means between said wheels, a universal joint for connecting one of said wheels to a drive axle, means for permitting of differential rotation of the associated wheels with respect to each other and means for connecting one of said journals to wheel tilting mechanism.

3. A dual wheel assemblage, comprising two hollow journals pivotally interconnected to insure the parallel tilting thereof, elongated supporting means projecting into each journal and to which said journals are pivotally secured so as to admit of the tilting thereof in a vertical plane, a wheel rotatably mounted on each journal, coupling means interconnecting said wheels, a universal joint for interconnecting one of said wheels to a drive axle and means for connecting one of said journals to wheel tilting mechanism.

4. A dual wheel assemblage, comprising a tubular axle housing, two pairs of opposing trunnions carried thereby, two hollow journals tiltable in a vertical plane which are pivotally interconnected together so as to move in unison throughout a vertical plane and each of which is supported on a different pair of trunnions, a wheel, having a central hub member, mounted on each journal, coupling means between said wheels, a universal joint for connecting said wheels to a drive axle, means for linking said journals together whereby tilting of said dual wheels in parallelism through a vertical plane is insured and means for connecting said journals to wheel tilting mechanism.

5. A dual wheel assemblage, comprising a tubular axle housing, two pairs of opposing trunnions carried thereby, dual wheels mounted on separate tiltable journals which latter are linked together so as to tilt in unison and each of which is supported on a different pair of trunnions, means, including a universal joint, for connecting one of said wheels to a drive axle, differential coupling means between said wheels and means for connecting one of said wheels with wheel tilting mechanism.

6. A dual wheel assemblage, comprising a tubular axle housing, two pairs of opposing trunnions carried thereby, two main hollow tiltable journals each of which is supported on a different pair of trunnions, means for pivotally securing said journals together to insure the parallel tilting thereof, dual wheels each mounted on a different one of said journals, coupling means interconnecting said wheels, a universal joint connected with one of said wheels for operatively connecting a drive axle therewith and means for connecting one of said journals with wheel tilting mechanism.

7. A dual wheel assemblage, comprising a tubular axle housing, two pairs of opposing trunnions carried thereby, two main hollow tiltable journals each of which is supported on a different pair of trunnions, means for pivotally securing said journals together to insure the parallel tilting thereof, dual wheels each mounted on a different one of said journals, differential coupling means between said wheels for operatively interconnecting the same while admitting of relative rotation thereof, a universal joint connected with one of said wheels for operatively connecting a drive axle therewith and means for connecting one of said journals with wheel tilting mechanism.

8. The sub-combination comprising tiltable dual wheels mounted on a common axle housing, means for operatively connecting the outermost wheel to a drive axle mounted within said housing and means for effecting the differential driving of the other wheel from the first mentioned wheel including a coupling of the Oldham type which has three associated relatively movable plates, one of the outer plates of which coupling carries a marginal ring gear and is rigidly connected to one of said wheels, a generally similar ring gear of the same diameter as the other gear rigidly secured to the latter wheel, a relatively rotatable cylindrical element carried by the latter wheel and a pinion carried by the cylindrical element which meshes with both of said ring gears.

JAMES DOBSON ALTEMUS.